United States Patent
Knaak

(10) Patent No.: US 6,820,942 B1
(45) Date of Patent: Nov. 23, 2004

(54) DUAL NON-INFLATABLE WHEEL ASSEMBLY FOR TRUCKS

(76) Inventor: Sammy K. Knaak, 1130 W. 1045 St., Clearfield, UT (US) 84015

( * ) Notice: Subject to any disclaimer, the term of this patent is extended or adjusted under 35 U.S.C. 154(b) by 0 days.

(21) Appl. No.: 10/378,323

(22) Filed: Mar. 4, 2003

(51) Int. Cl.[7] .............................................. B60B 25/04
(52) U.S. Cl. ...................... 301/9.2; 301/10.1; 152/396
(58) Field of Search ............................... 301/13.2, 36.1, 301/13.1, 9.1, 10.1, 11.1, 39.1, 40.2, 40.3, 41.1; 152/379.3, 379.4, 382, 393, 396, 397, 398, 402, 403

(56) References Cited

U.S. PATENT DOCUMENTS

| | | | |
|---|---|---|---|
| 1,096,721 A | * 5/1914 | Jamieson | 301/22 |
| 1,136,892 A | * 4/1915 | Copithorn | 301/13.1 |
| 1,137,350 A | * 4/1915 | Phillips | 301/13.1 |
| 1,147,477 A | * 7/1915 | Arnold | 301/13.1 |
| 1,402,443 A | * 1/1922 | Putnam | 301/36.1 |
| 1,448,144 A | * 3/1923 | Moore | 301/36.1 |
| 1,641,663 A | * 9/1927 | Dalton | 301/64.305 |
| 1,780,404 A | * 11/1930 | Schooling | 301/39.1 |
| 1,791,128 A | * 2/1931 | Hatfield | 152/58 |
| 1,948,136 A | * 2/1934 | Scheckler | 301/38.1 |
| 1,976,068 A | * 10/1934 | Higbee | 301/1 |
| 4,566,515 A | 1/1986 | Kuhn | |
| 4,818,031 A | * 4/1989 | Brown | 301/36.1 |
| 4,966,212 A | 10/1990 | Hill | |
| 5,053,095 A | 10/1991 | Hill | |
| 5,135,288 A | 8/1992 | Kelly | |
| D398,517 S | 9/1998 | Lee | |

FOREIGN PATENT DOCUMENTS

| | | | |
|---|---|---|---|
| FR | 2556656 | * | 12/1983 |
| JP | 62-273105 | * | 11/1987 |

* cited by examiner

Primary Examiner—Russell D. Stormer

(57) ABSTRACT

A dual non-inflatable wheel assembly for trucks for providing a tire which cannot be punctured and lasts longer than tires filled with air. The dual non-inflatable wheel assembly for trucks includes a hub assembly including a hub member and further including a boss being centrally disposed upon the hub member; and also includes a wheel rim member being fastened to the hub assembly; and further includes pieces of solid material being made of rubber and being attached about the hub assembly and the wheel rim member; and also includes retaining rings being fastened to the hub assembly and to the wheel rim member for retaining the pieces of solid material about the hub member and the wheel rim member.

1 Claim, 3 Drawing Sheets

DUAL NON-INFLATABLE WHEEL ASSEMBLY FOR TRUCKS

BACKGROUND OF THE INVENTION

1. Field of the Invention

The present invention relates to dual non-inflatable wheels for trucks and more particularly pertains to a new dual non-inflatable wheel assembly for trucks for providing a tire which cannot be punctured and lasts longer than tires filled with air.

2. Description of the Prior Art

The use of dual non-inflatable wheels for trucks is known in the prior art. More specifically, dual non-inflatable wheels for trucks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,089,292; U.S. Pat. No. 4,566,515; U.S. Pat. No. 5,135,288; U.S. Patent No. 4,966,212; U.S. Pat. No. 5,053,095; and U.S. Des. Pat. No. 398,517.

While these devices fulfill their respective, particular objectives and requirements, the aforementioned patents do not disclose a new dual non-inflatable wheel assembly for trucks. The prior art includes wheels having hubs, rims, and solid pieces of rubber wound about the rims.

SUMMARY OF THE INVENTION

The general purpose of the present invention, which will be described subsequently in greater detail, is to provide a new dual non-inflatable wheel assembly for trucks which has many of the advantages of the dual non-inflatable wheels for trucks mentioned heretofore and many novel features that result in a new dual non-inflatable wheel assembly for trucks which is not anticipated, rendered obvious, suggested, or even implied by any of the prior art dual non-inflatable wheels for trucks, either alone or in any combination thereof. The present invention includes a hub assembly including a hub member and further including a boss being centrally disposed upon the hub member; and also includes a wheel rim member being fastened to the hub assembly; and further includes pieces of solid material being made of rubber and being attached about the hub assembly and the wheel rim member; and also includes retaining rings being fastened to the hub assembly and to the wheel rim member for retaining the pieces of solid material about the hub member and the wheel rim member. None of the prior art includes the combination of the elements of the present invention.

There has thus been outlined, rather broadly, the more important features of the dual non-inflatable wheel assembly for trucks in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new dual non-inflatable wheel assembly for trucks which has many of the advantages of the dual non-inflatable wheels for trucks mentioned heretofore and many novel features that result in a new dual non-inflatable wheel assembly for trucks which is not anticipated, rendered obvious, suggested, or even implied by any of the prior art dual non-inflatable wheels for trucks, either alone or in any combination thereof.

Still another object of the present invention is to provide a new dual non-inflatable wheel assembly for trucks for providing a tire which cannot be punctured and lasts longer than tires filled with air.

Still yet another object of the present invention is to provide a new dual non-inflatable wheel assembly for trucks that is easy and convenient to mount to the axles of trucks.

Even still another object of the present invention is to provide a new dual non-inflatable wheel assembly for trucks that adds safety to the roadways since the tires cannot blowout.

These together with other objects of the invention, along with the various features of novelty which characterize the invention, are pointed out, with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
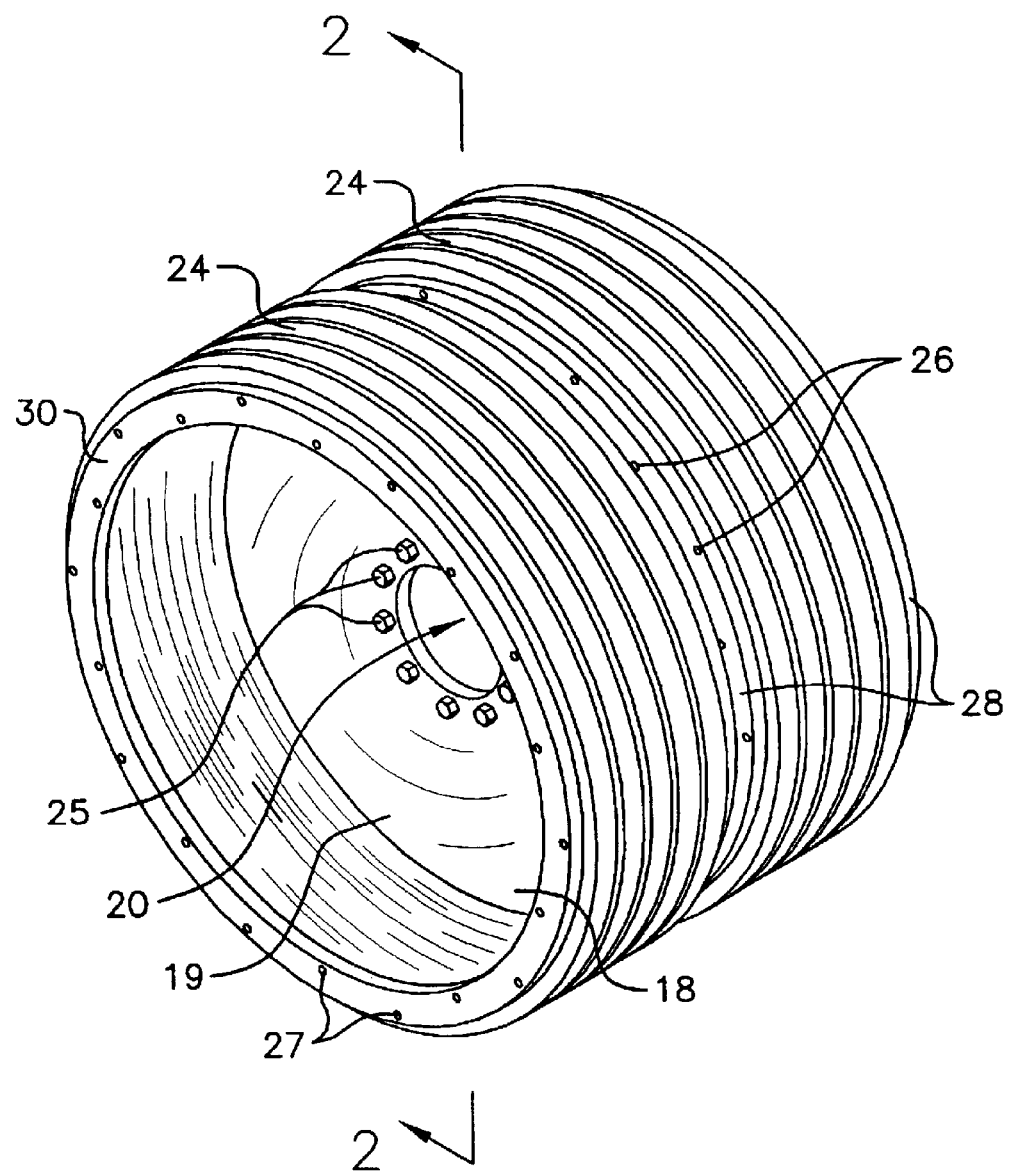
FIG. 1 is a perspective view of a new dual non-inflatable wheel assembly for trucks according to the present invention.
Figure 2:
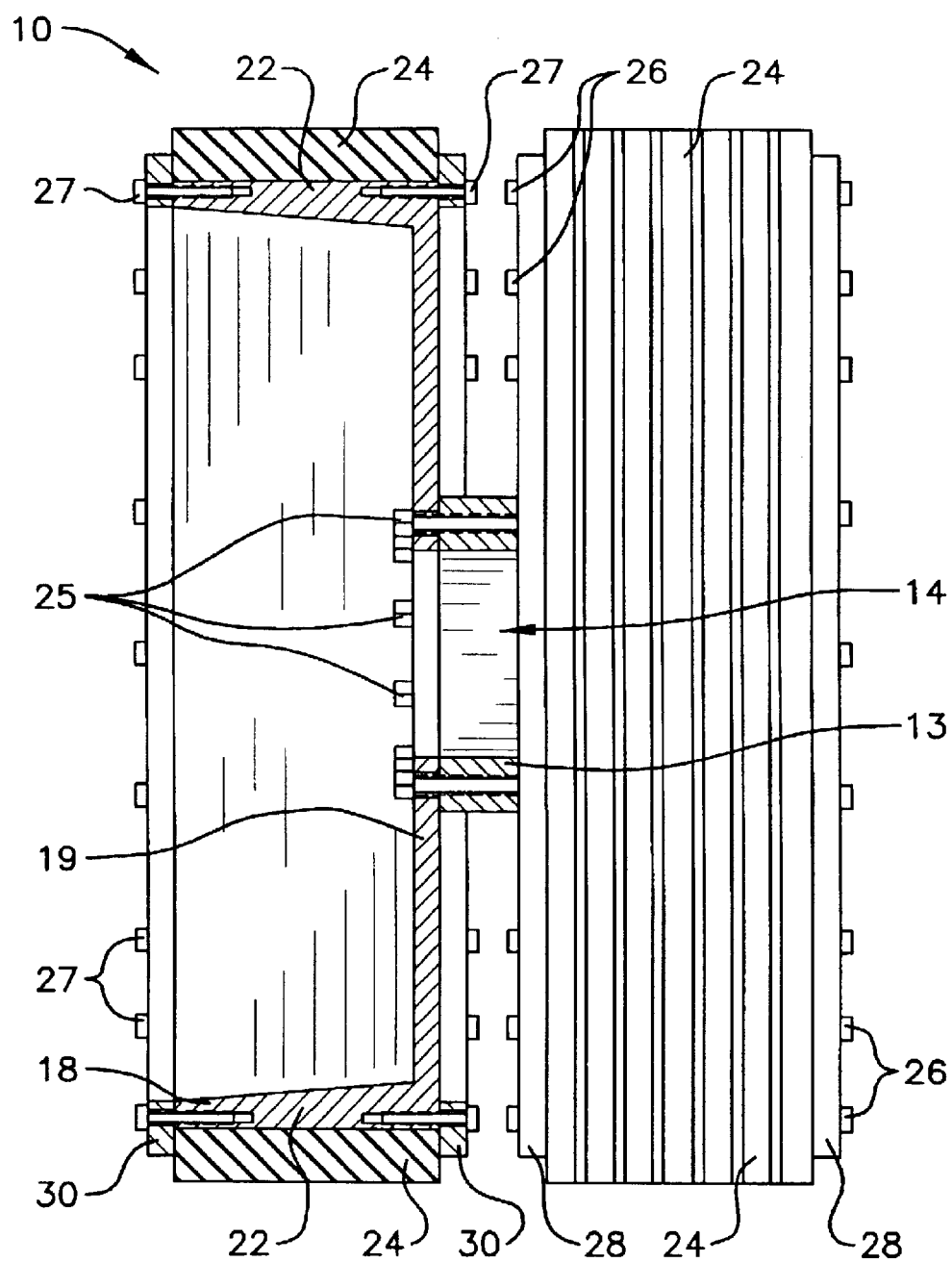
FIG. 2 is a partial cross-sectional view of the present invention.
Figure 3:
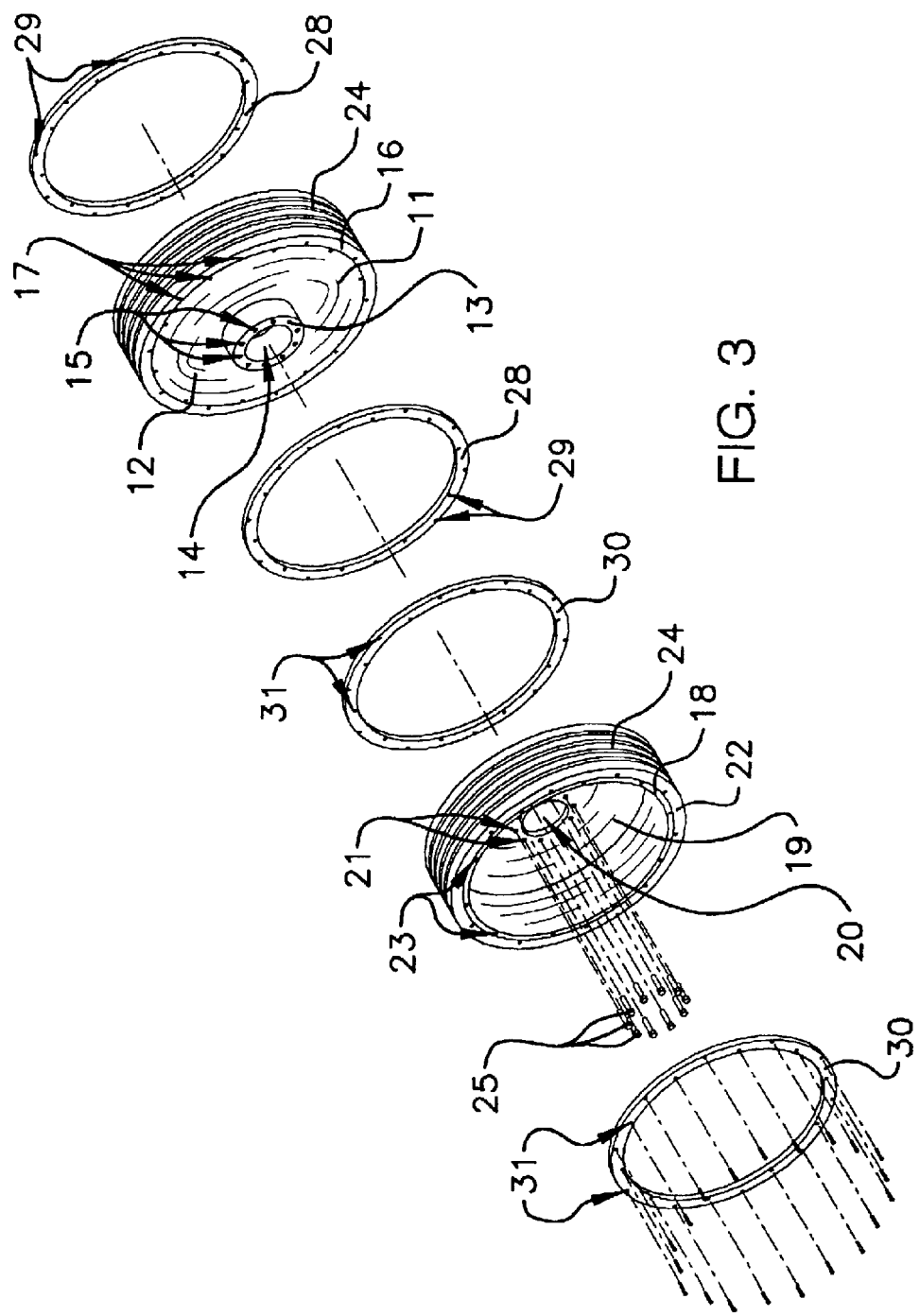
FIG. 3 is an exploded perspective view of the present invention.

With reference now to the drawings, and in particular to FIGS. 1 through 3 thereof, a new dual non-inflatable wheel assembly for trucks embodying the principles and concepts of the present invention and generally designated by the reference numeral 10 will be described.

As best illustrated in FIGS. 1 through 3, the dual non-inflatable wheel assembly for trucks 10 generally comprises a hub assembly including a hub member 11 and further including a boss 13 being centrally and integrally disposed upon the hub member 11. The hub member 11 has a definite lateral thickness of approximately 10 inches and has a side wall 12 and an endless band-shaped rim 16 being conventionally disposed and attached thereabout. The boss 13 is conventionally disposed upon and attached to the side wall 12. The hub assembly has a bore 14 being disposed through the boss 13 and the hub member 11 along a longitudinal axis thereof. The boss 13 has holes 15 being spacedly and circumferentially disposed in an end thereof. The endless belt-shaped rim 16 has holes 17 being spacedly disposed in longitudinal ends thereof.

A wheel rim member 18 is fastened to the hub assembly. The wheel rim member 18 includes a main wall portion 19 having an opening 20 being centrally disposed therethrough and being aligned with the bore 14 of the hub assembly, and also includes an endless band-shaped rim portion 22 being integrally disposed along an outer edge of the main wall portion 19 and extending outwardly generally perpendicular to the main wall portion 19 and having a width of approximately 10 inches. The main wall portion 19 has holes 21 being spacedly disposed therethrough about the opening 20 with the boss 13 being fastened with fastener members 25 to the main wall portion 19 with fastener members 25 being received in the holes 15 of the boss 13 and the main wall portion 19. The endless band-shaped rim portion 22 has holes 23 being spacedly disposed in longitudinal ends thereof. Pieces of solid material 24 being made of rubber are conventionally attached about endless belt-shaped rim 16 of the hub assembly and the wheel rim member 18. The pieces of solid material 24 are generally tires having treads for gripping a ground surface.

Retaining rings 28,30 are fastened to the hub assembly and to the wheel rim member 18 for retaining the pieces of solid material 24 about the endless belt-shaped rim 16 and the wheel rim member 18. The retaining rings 28,30 include a first pair of the retaining rings 28 having holes 29 being spacedly disposed therethrough and being oppositely fastened with fasteners 26 to the endless belt-shaped rim 16 of the hub member 11 with the fasteners 26 being received in the holes 29 of the first pair of the retaining rings 28 and the holes 17 of endless belt-shaped rim 16 of the hub member 11; and also include a second pair of the retaining rings 30 having holes 31 being spacedly disposed therethrough and being oppositely fastened with fastening members 27 to the endless band-shaped rim portion 22 of the wheel rim member 18 with the fastening members 27 being received in the holes 31 of the second pair of the retaining rings 30 and the holes 23 of the endless band-shaped rim portion 22.

In use, the user securely mounts the hub member 11 together with the wheel rim member 18 upon an axle of a truck. The use will not suffer any blowouts with the dual non-inflatable wheel assembly for trucks 10, and since air pressure is not used, the tires 24 will wear evenly and will last longer as a result.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the dual non-inflatable wheel assembly for trucks. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual non-inflatable wheel assembly for trucks comprising:

a hub assembly including a hub member and further including a boss being centrally disposed upon said hub member, said hub member having a definite lateral thickness of approximately 10 inches and has a side wall and a rim being disposed thereabout, said boss being disposed upon and attached to said side wall, said hub assembly having a bore being disposed through said boss and said hub member along a longitudinal axis thereof, said boss having holes being spacedly and circumferentially disposed in an end thereof, said rim having holes being spacedly disposed in longitudinal ends thereof;

a wheel rim member being fastened to said hub assembly, said wheel rim member including a main wall portion having an opening being centrally disposed therethrough and being aligned with said bore of said hub assembly, and also including a rim portion being disposed along an outer edge of said main wall portion and extending outwardly generally perpendicular to said main wall portion and having a width of approximately 10 inches, said main wall portion having holes being spacedly disposed therethrough about said opening with said boss being fastened with fastener members to said main wall portion, said fastener members being received in said holes of said boss and said main wall portion, said rim portion having holes being spacedly disposed in longitudinal ends thereof;

solid material being made of rubber and being attached about said hub assembly and said wheel rim member, solid material being generally tires having treads for gripping a ground surface; and retaining rings being fastened to said hub assembly and to said wheel rim member for retaining said pieces of solid material about said hub member and said wheel rim member, said retaining rings including a first pair of said retaining rings having holes being spacedly disposed therethrough and being oppositely fastened with fasteners to said rim of said hub member, said fasteners being received in said holes of said first pair of said retaining rings and said holes of said rim of said hub member; and also including a second pair of said retaining rings having holes being spacedly disposed therethrough and being oppositely fastened with fastening members to said rim portion of said wheel rim member, said fastening members being received in said holes of said second pair of said retaining rings and said holes of said rim portion.

\* \* \* \* \*